(12) United States Patent
Reutlinger

(10) Patent No.: US 7,055,481 B2
(45) Date of Patent: Jun. 6, 2006

(54) COOLING WATER HEATING VIA GENERATOR POWER LOSSES

(75) Inventor: Kurt Reutlinger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/472,318

(22) PCT Filed: Nov. 11, 2002

(86) PCT No.: PCT/DE02/04159

§ 371 (c)(1),
(2), (4) Date: Mar. 22, 2004

(87) PCT Pub. No.: WO03/060296

PCT Pub. Date: Jul. 24, 2003

(65) Prior Publication Data

US 2004/0154573 A1     Aug. 12, 2004

(30) Foreign Application Priority Data

Jan. 18, 2002   (DE) ............................... 102 01 755

(51) Int. Cl.
*F02N 17/02* (2006.01)
(52) U.S. Cl. ............................................. 123/142.5 E
(58) Field of Classification Search ......... 123/142.5 R, 123/142.5 E, 192.1
See application file for complete search history.

(56) References Cited

U.S. PATENT DOCUMENTS 4,427,150 A * 1/1984 van Basshuysen et al. ...... 123/142.5 E
4,699,097 A * 10/1987 Tanaka et al. ............ 123/192.1

FOREIGN PATENT DOCUMENTS

| DE | 31 28 081 | 11/1982 |
| DE | 198 46 220 | 4/2000 |
| DE | 100 43 059 | 3/2002 |
| DE | 100 47 222 | 4/2002 |
| FR | 2 780 575 | 12/1999 |
| WO | WO 99/67873 | * 12/1999 |
| WO | WO 01 17085 | 3/2001 |

* cited by examiner

*Primary Examiner*—Noah Kamen
(74) *Attorney, Agent, or Firm*—Kenyon & Kenyon LLP

(57) ABSTRACT

A method and a device for rapidly warming up a liquid-cooled internal combustion engine, in particular of a motor vehicle engine, by warming up the cooling liquid. The cooling liquid is warmed in a simple manner without additional provision of heating elements in that the cooling liquid is warmed using a generator that is operated during a heating phase at an operating point having high power loss and at the operating temperature of the engine at an operating point having low power loss.

7 Claims, 2 Drawing Sheets

COOLING WATER HEATING VIA GENERATOR POWER LOSSES

FIELD OF THE INVENTION

The present invention relates to a method and device for rapidly warming up a liquid-cooled internal combustion engine.

BACKGROUND INFORMATION

Internal combustion engines have substantially higher efficiency at the operating temperature than immediately after starting and thus work optimally in the warmed-up state. It may take a considerable amount of time until the engine has warmed up, especially at low ambient temperatures and with a small load. This problem plays an even more serious role in high-efficiency diesel engines.

Conventionally, in order to warm up the internal combustion engine to operating temperature as quickly as possible, additional electric heating devices heat up the cooling water after starting. A heating resistor is usually provided that is powered directly by the generator and heats up the cooling water in a short time. Conventional cooling water heating devices have a relatively complicated construction, however, and require in particular additional heating elements to heat up the engine.

SUMMARY

It is an object of the present invention to create a cooling water heating device having a substantially simpler construction.

In accordance with an example embodiment of the present invention, the power loss of a generator, in particular of a crankshaft starter generator, is used to warm up the cooling water of an internal combustion engine. The generator is preferably a permanent magnet synchronous generator that is also connected to the cooling water circulation system of the internal combustion engine.

The generator is operated to supply a sufficient amount of heating power during a heating phase at an operating point having large, preferably maximum power loss, and at an operating temperature of the engine at an operating point having small, preferably minimum power loss. The efficiency of the generator is regulatable using either threshold values or characteristic curves. That means it is possible to adjust generator efficiency stepwise using temperature threshold values or continuously using characteristic curves as a function of the engine temperature or coolant temperature.

Generator efficiency is adjusted using a suitable device, for example using a pulse-controlled inverter, preferably by changing the phase angle between generator current and generator voltage.

Especially effective warming of the cooling water is attainable if a crankshaft starter generator (CSG) is used for this purpose.

BRIEF DESCRIPTION OF THE DRAWINGS

The present invention is explained in greater detail below using the example embodiments illustrated in the drawings.

DETAILED DESCRIPTION OF EXAMPLE EMBODIMENTS

Figure 1:
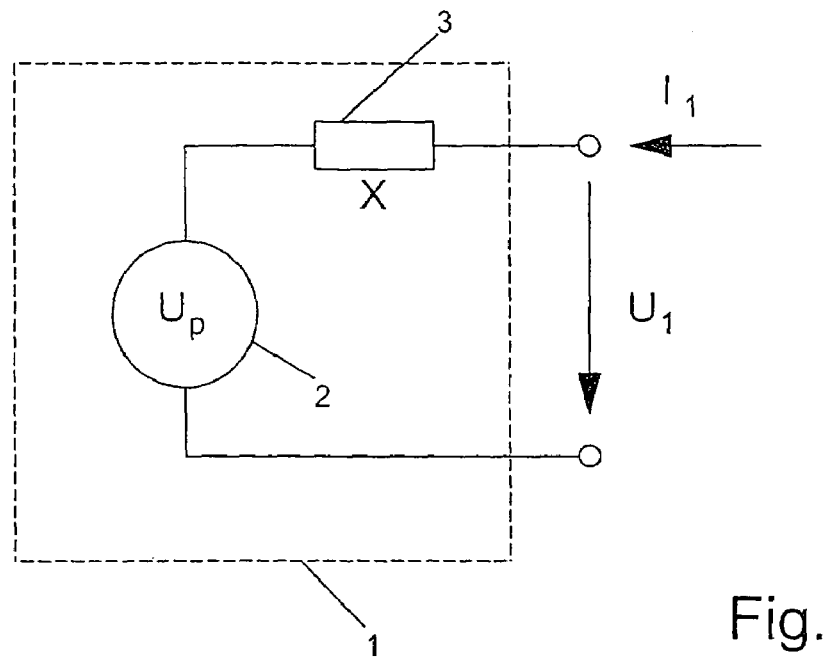
FIG. 1 shows a schematic equivalent circuit diagram of a crankshaft starter generator.

FIG. 1 shows the equivalent circuit diagram of a crankshaft starter generator (CSG) that is designed as a permanent magnet synchronous machine 1 and is connected to a vehicle's electrical system via a pulse-controlled inverter (not shown).

Synchronous machine 1 is fundamentally characterized by an interior voltage source 2 having synchronous generated voltage Up and inductive resistance 3. It is possible to ignore the ohmic coil resistance for performance, but it is responsible for the losses ($3*R*I^2$).

Both variables Up and X are proportional to the frequency, i.e., the speed of machine 1. Synchronous generated voltage Up of synchronous machine 1 is thus constant at a given speed, and terminal voltage U1 of synchronous machine 1 is also constant, having a maximum value U1=U1max that is provided by the battery voltage or line voltage.

Synchronous machine 1 works almost in the entire generator operating range in the field-weakening range. That means that synchronous generated voltage Up is greater than the maximum terminal voltage U1 of synchronous machine 1.

Figure 2:
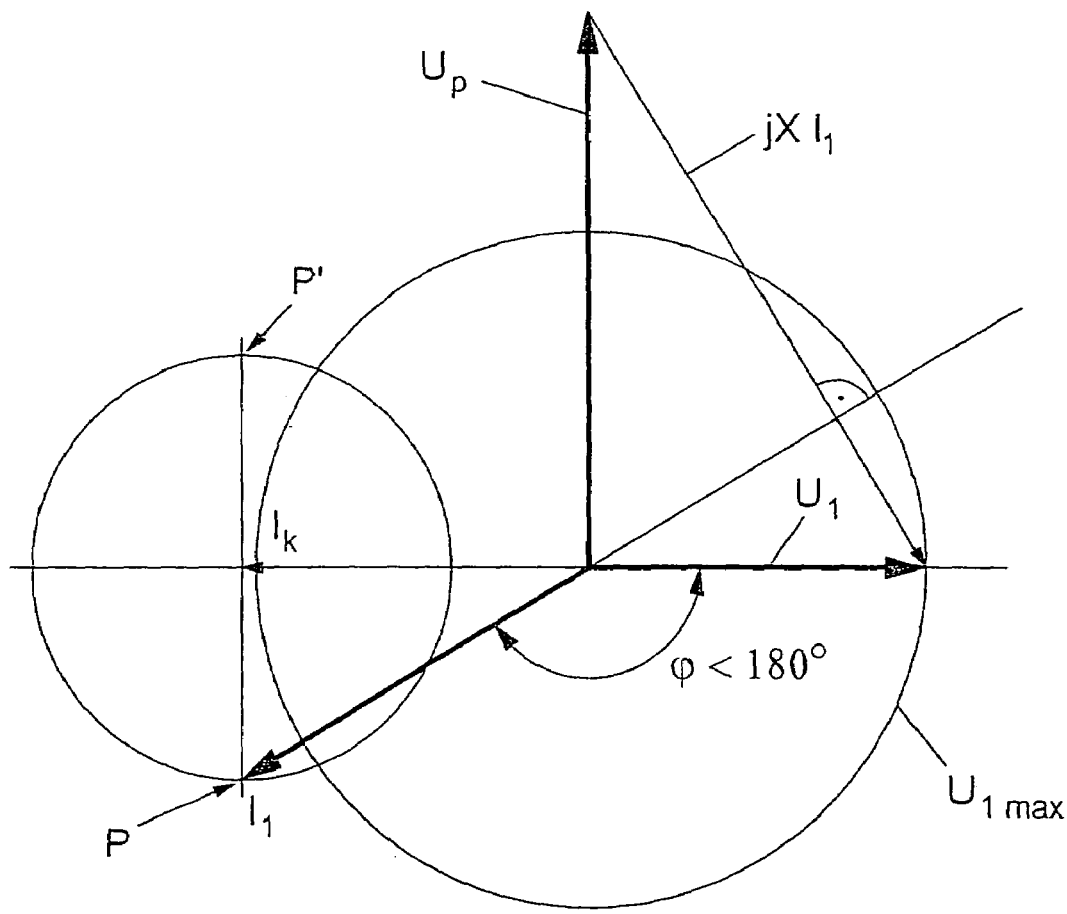
FIG. 2 shows a representation of currents and voltages in the equivalent circuit diagram of FIG. 1 at maximum generator power.

FIG. 2 shows a current-voltage diagram in the complex plane for full-load operation (CSG 2 produces all generator power). If synchronous generated voltage Up of synchronous machine 1 is plotted on the real axis in the complex plane, then terminal voltage U1 of synchronous machine 1 is able to travel on a circle having the radius of the maximum terminal voltage U1max (depending on how the electronics adjust the phase angle).

The machine current I1 produced this way also has a circle as a locus. The center of the current circle is on the tip of short circuit current Ik (=Up/jX), and the radius of the circle is U1/jX.

The component of machine current I1 creating the torque is parallel to synchronous generated voltage Up (real component of I1). Points P, P' of maximum power are thus easy to detect. FIG. 2 shows the maximum power point in generator operation (lower half of the current circle) via reference symbol P and the maximum power point in engine operation (upper half of the current circle) via reference symbol P'.

Voltage across inductive internal resistance jXI1 is derived following Kirchhoff's Loop Rule using jXI1=−Up+U1 shown in FIG. 2 as voltage vector jXI1 between vectors Up and U1.

Figure 3:
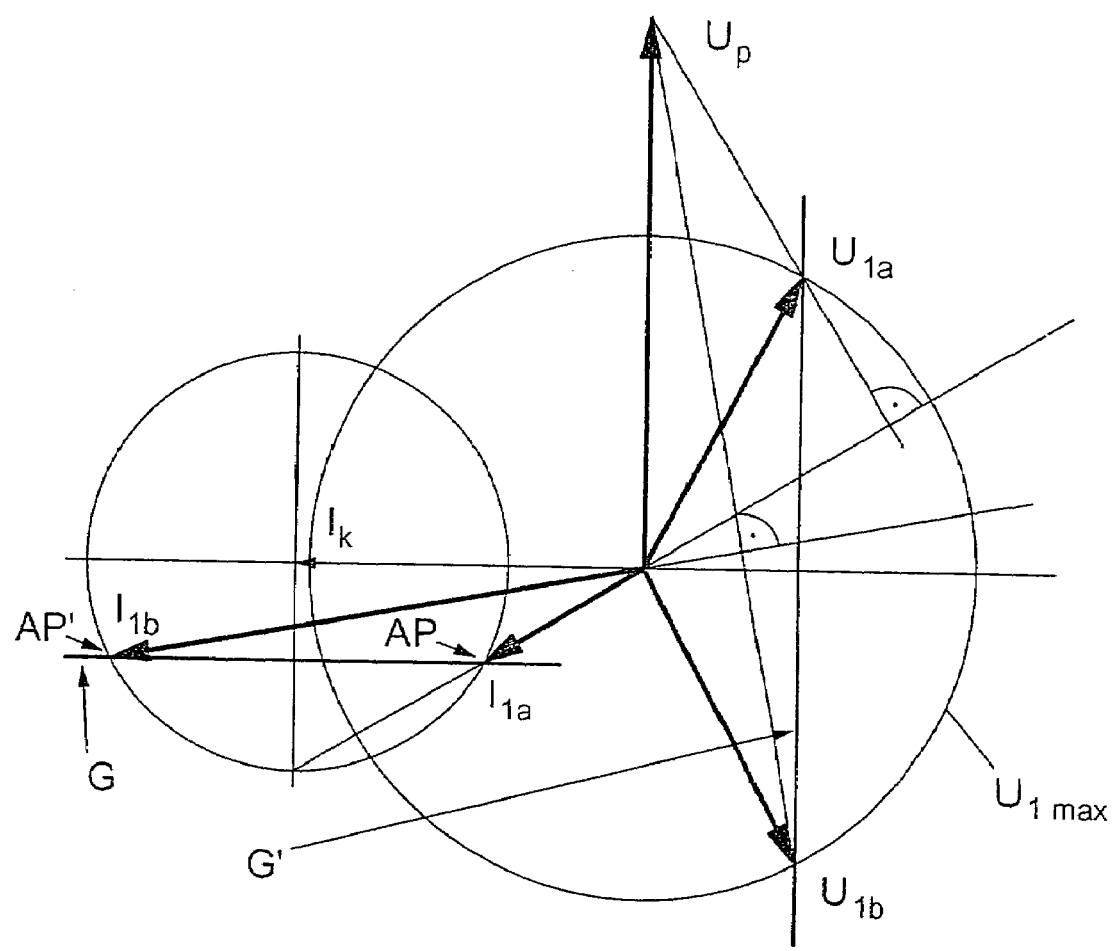
FIG. 3 shows a representation of currents and voltages in the equivalent circuit diagram of FIG. 1 at minimum and maximum generator power loss.

FIG. 3 shows a current-voltage diagram of synchronous machine 1 for the partial-load range (the CSG provides less than full generator power).

In the converter's block mode (U1=U1max), there are two operating points AP, AP' where a requested power level is reached.

With a sufficiently high engine temperature, generator regulation (not shown) is normally adjusted so that it adjusts the operating point AP with index a (U1a, I1a). At this operating point AP, the requested generator power $P_G$=3*UP I1 cosphi is generated having minimal machine current I1 and thus the smallest ohmic power loss as well.

Along constant power straight lines G (here, the real component of machine current I1 is always constant), there exists a second operating point AP' having the same generator power but with distinctly higher machine current I1b. At this operating point AP, the real component (q component) of current I1 (parallel to Up) is equal to that at first operating point AP, but the imaginary component (d component) of the current (transverse to Up) is distinctly greater. Thus, operating point AP' here has been reached using the greatest ohmic power loss, which again is usable to heat up the cooling water and thereby warm up the engine.

If there is deviation from the converter's block mode (U1=U1max) discussed above and if smaller values are permitted for terminal voltage U1, then ohmic power loss and generator efficiency are adjustable in any desired way along G,G' constant power straight lines. Copper losses in synchronous machine 1 are thus variable in any way within the two threshold values I1a, I1b.

Continuous regulation of generator efficiency as a function of engine temperature is not absolutely required for purposes of warming up cooling water. Instead, setting operating point AP' of maximum losses is sufficient as a rule in the heating phase, and, if the engine is at operating temperature, operating at operating point AP of minimum losses is sufficient after the heating phase.

The current circle becomes smaller as the speed of generator 1 increases. This then limits the possibility of increasing the power loss. For the cooling water heating device, however, the internal combustion engine's idling (ca. 700–800 l/min.) is of special significance.

The internal combustion engine works using mostly greater loads at higher speeds, generating greater power loss, while the speed-dependent losses, such as iron losses, for example, increase in the CSG.

What is claimed is:

1. A method of quickly warming up a liquid-cooled internal combustion engine, comprising:

warming up the cooling liquid using a permanent magnet synchronous generator, the generator being operated during a heating phase at an operating point having a maximum power loss, and the generator being operated at an operating point having low power loss when an operating temperature of the engine has been achieved, the setting of the operating point being performed by determining a phase relation between a generator current and a generator voltage.

2. The method according to claim 1 wherein the engine is a motor vehicle engine.

3. The method as recited in claim 1, wherein the generator is operated, with the engine being cold, at an operating point having maximum power loss and, when the engine is at operating temperature, at an operating point having minimal power loss.

4. The method as recited in claim 1, further comprising:

adjusting an efficiency of the generator using threshold values or characteristic curves as a function of a temperature of the engine or a temperature of the cooling liquid.

5. The method according to claim 1, wherein the operating temperature of the engine is an operating temperature of a motor vehicle engine.

6. The method as recited in claim 1, wherein the generator is a crankshaft starter generator.

7. The method as recited in claim 1, further comprising:

adjusting an efficiency of the generator by a pulse-controlled inverter.

* * * * *